July 31, 1956  N. G. SCHAFFER  2,756,886
DETACHABLE CARRIER FOR INDUSTRIAL TRUCKS
Filed June 30, 1954
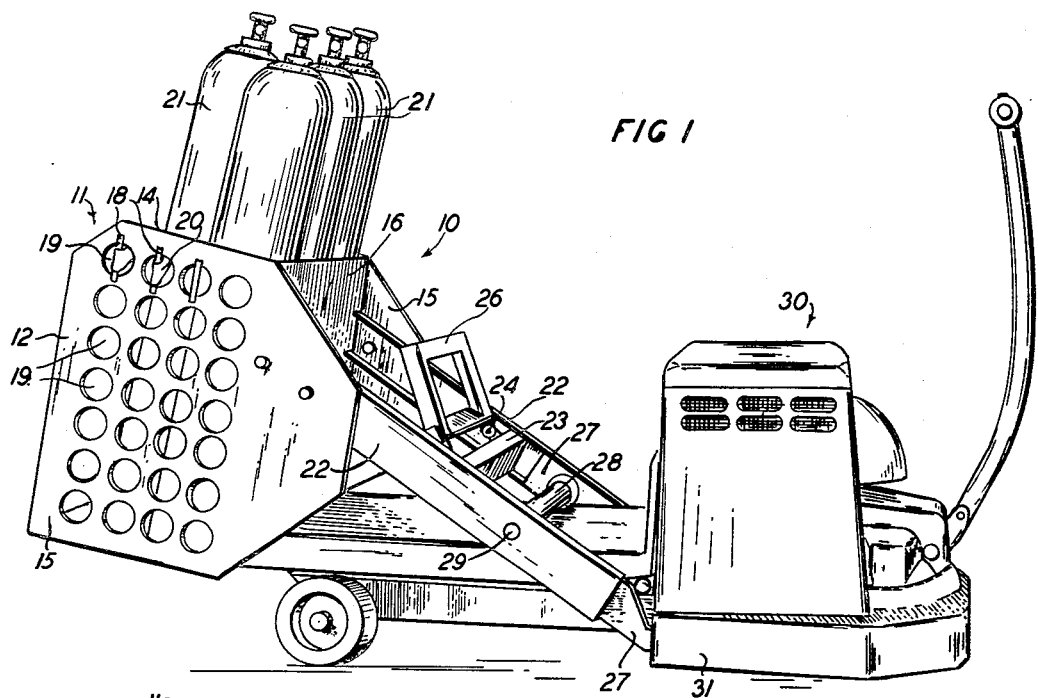
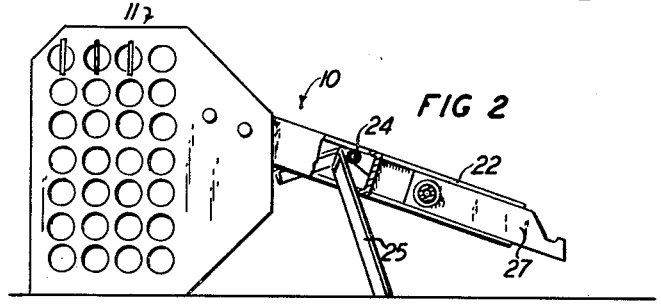
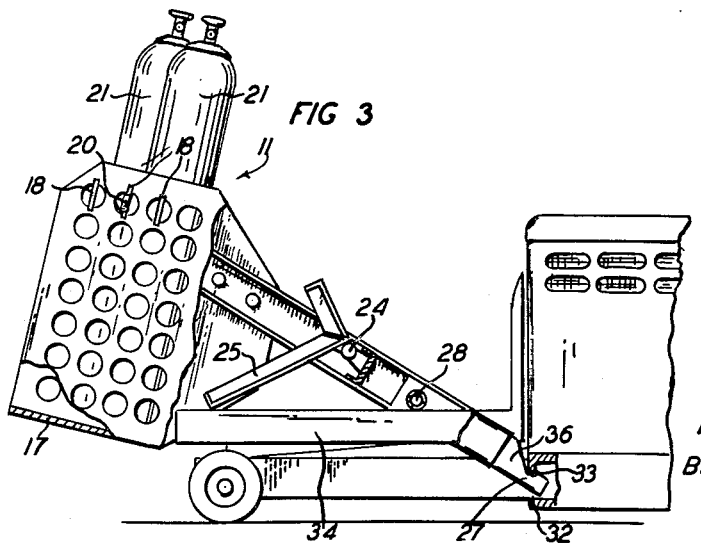
INVENTOR
N. G. SCHAFFER
BY
W. C. Parnell
ATTORNEY

United States Patent Office 2,756,886
Patented July 31, 1956

2,756,886

DETACHABLE CARRIER FOR INDUSTRIAL TRUCKS

Norman G. Schaffer, Emmaus, Pa., assignor to Western Electric Company, Incorporated, New York, N. Y., a corporation of New York Application June 30, 1954, Serial No. 440,376

3 Claims. (Cl. 214—515)

This invention relates to detachable carriers for industrial trucks and has for its object an open carrier normally positioned on the floor for receiving heavy and bulky articles and readily attached to and detached from an industrial truck.

Many types of skids and containers have been designed to support articles for transportation by industrial trucks, but there are certain heavy and bulky articles such as gas cylinders which cannot be transported in this manner. The object of this invention is to permit conventional gas cylinders to be easily loaded on or removed from a skid or other elevated platform. Also, reckless handling of gas tanks is dangerous for the reason that, if a cylinder of hydrogen should fall and break the valve mechanism, a severe explosion may occur.

With the aforementioned object in view, the invention comprises a detachable carrier for an industrial truck including an open receptacle adapted to rest on the floor and readily receive and discharge articles therefrom, the receptacle having arms fixed adjacent the back thereof adapted for engagement with the frame of the truck and to be rocked about this connection during elevation of the platform of the truck to raise and lower the receptacle.

In the present embodiment of the invention, the arms have hook-shaped free ends normally positioned for interengagement with projections of the frame of the truck and normally held in this position by a stabilizing element pivotally supported by the arms, and adapted to rest on the floor when in its normal position. A roller interposed between the arms and supported thereby is adapted to be engaged by the platform of the truck and adapt the platform to cause rocking movement of the carrier from and to the floor at the beginning and end of transportation of articles from one position to another.

Other objects and advantages will be apparent from the following detailed description when considered in conjunction with the accompanying drawing, wherein:

Fig. 1 is a perspective view of the carrier attached to an industrial truck;

Fig. 2 is a side elevational view of the carrier resting on the floor, and

Fig. 3 is a fragmentary side elevational view of the carrier and truck, portions thereof being shown in section.

Referring now to the drawing, the detachable carrier indicated generally at 10 includes an open receptacle 11 with an open front 12 and an open top 14. Apertured sides 15, a back 16 which may, if desired, be apertured and a bottom member 17 complete the receptacle. The sides 15 have bars 18 welded in position across certain of the apertures 19 about which retaining straps 20 may be positioned to secure articles such as gas tanks 21 against displacement in the receptacle.

Parallel arms 22 have like ends fixed to rearwardly extending projections or extensions of the sides 15. The arms 22 are composed of channel members reinforced by a laterally extending channel member 23 which supports the pivots or pin-supporting brackets 24 for a stabilizing element 25. The element 25 is formed of angle members and provided with two legs (only one of which is shown) adapted to rest upon the floor (as shown in Fig. 2) to prevent tilting of the receptacle 11 during loading or unloading. A projection 26 of the stabilizer 25 serves to bias the stabilizer for counterclockwise movement about its pivots 24 normally urging the stabilizer into the position shown in Fig. 2.

Hook-like projections or members 27 are fixedly mounted in the lower ends of the arms 22 and are considered as parts of the arms. A roller 28 is interposed between the arms 22 and is supported for rotation on a spindle 29, the ends of which are fixed in the arms and extend through apertures in the hook portions 27 thereof, as well as the channel members of which the arms are composed.

In the present embodiment of the invention, the detachable carrier is illustrated with the hand type industrial truck 30 having a wheel supported frame 31 provided with openings 32 for the hook-shaped ends 27 and with projecting portions 33 at each side of the truck for interengagement with the hook-shaped ends as (illustrated in Fig. 3). The truck is also provided with the conventional platform 34 adapted for movement vertically.

When the detachable carrier 10 is in the position (shown in Fig. 2), it may be loaded readily with articles such as the gas tanks 21 owing to the fact that the bottom member 17 of the receptacle rests directly on the floor and the tanks or other articles may be rolled or otherwise moved into position in the receptacle. When the desired number of articles or tanks have been loaded in the receptacle, they may be secured in place by one or more straps 20 fastened in any desired manner through the aid of the pins 18 at each side 15. When the carrier is loaded, the truck 30 may be backed between the arms 22 with the platform 34 in its lowermost position. During this movement, the leading end of the truck, or the platform thereof, will engage the stabilizing element 25 and rock it about its pivots 24 (as illustrated in Fig. 3). The motion of the truck will continue until the hook-shaped ends 27 of the arms will be disposed in the apertures 32 of the main frame 31 of the truck. This may be determined readily as this portion of the truck frame will strike against diagonal surfaces 36 of the arms 22, or the hook-shaped ends 27 thereof, indicating to the operator that the truck is in position to elevate the carrier. This is accomplished by elevating the platform 34 in the conventional manner, causing it to engage the roller 28 and move the arms about the projections 33 at the hooked ends 27 of the arms 22, thus moving the carrier into the position shown in Fig. 3. In this position the carrier may be transported to any desired location and placed on the floor (as shown in Fig. 2) by lowering the platform 34 until the receptacle 11 comes to a rest. As soon as this has been accomplished, the truck may be moved free of the carrier and, in doing so, the stabilizing element 25 will follow the truck or the platform 34 until it has reached its normal position (as shown in Fig. 2).

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A detachable carrier for an industrial truck having a wheel supported frame with projecting portions at the sides thereof and a platform movable vertically, the detachable carrier comprising an open receptacle adapted to rest on a floor to readily receive and discharge articles therefrom, the receptacle having an open front and top and closed bottom sides and back, spaced arms having like inner ends fixed to the receptacle adjacent the back and outer ends adapted to rockably engage the projecting portions of the truck, and a roller disposed between the arms for engagement with the top of the platform when raised and lowered to cause said outer ends to rock about said projections to pivotally raise and lower the receptacle.

2. A detachable carrier for an industrial truck having a wheel supported frame with projecting portions at the sides thereof and a platform movable vertically, the detachable carrier comprising an open receptacle adapted to rest on a floor to readily receive and discharge articles therefrom, the receptacle having an open front and top and closed bottom sides and back, spaced arm having hook-like free ends to removably and rockably engage the projections of the truck, the other ends being fixed to the receptacle adjacent the back thereof, and a roller disposed between the arms for engagement with the top of the platform when raised and lowered to cause the hook-like free ends of the arms to rock about the projections to pivotally raise and lower the receptacle.

3. A detachable carrier for an industrial truck having a wheel supported frame with projecting portions at the sides thereof and a platform movable vertically, the detachable carrier comprising an open receptacle adapted to rest on a floor to readily receive and discharge articles therefrom, the receptacle having an open front and top and closed bottom sides, and back, spaced arms having hook-like free ends to removably engage the projections of the truck, the other ends being fixed to the receptacle adjacent the back thereof, a roller disposed between the arms for engagement with the platform when raised and and lowered to raise and lower the receptacle, and means to secure articles against displacement in the receptacle.

References Cited in the file of this patent

UNITED STATES PATENTS

| | | |
|---|---|---|
| 2,182,005 | Stetson | Dec. 5, 1939 |
| 2,233,005 | Garlinghouse | Feb. 25, 1941 |
| 2,264,216 | Milligan | Nov. 25, 1941 |
| 2,319,456 | Hazen | May 18, 1943 |
| 2,387,687 | Smith | Oct. 23, 1945 |
| 2,441,750 | Britton | May 18, 1948 |
| 2,499,458 | Campbell | Mar. 7, 1950 |